(12) United States Patent
Guijarro Valencia et al.

(10) Patent No.: US 12,523,178 B1
(45) Date of Patent: Jan. 13, 2026

(54) COMPRESSOR BLEED-AIR BOOST SYSTEM

(71) Applicants: General Electric Deutschland Holding GmbH, Frankfurt (DE); c/o General Electric Company, Evendale, OH (US)

(72) Inventors: Antonio Guijarro Valencia, Munich (DE); Paul A. Intemann, Ft. Thomas, KY (US); Marta Pelivan, Munich (DE); Mustafa Kocaguel, Munich (DE)

(73) Assignees: General Electric Deutschland Holding GmbH, Frankfurt (DE); c/o General Electric Company, Evendale, OH (US)

( * ) Notice: Subject to any disclaimer, the term of this patent is extended or adjusted under 35 U.S.C. 154(b) by 0 days.

(21) Appl. No.: 18/958,312

(22) Filed: Nov. 25, 2024

(51) Int. Cl.
*F02C 9/18* (2006.01)
*F01D 5/08* (2006.01)

(52) U.S. Cl.
CPC ............... *F02C 9/18* (2013.01); *F01D 5/082* (2013.01)

(58) Field of Classification Search
CPC ......... F02C 9/18; F01D 5/082; F04D 27/0238
See application file for complete search history.

(56) References Cited

U.S. PATENT DOCUMENTS

| | | | |
|---|---|---|---|
| 4,415,310 A | 11/1983 | Bouiller et al. | |
| 4,541,774 A | 9/1985 | Rieck et al. | |
| 5,205,706 A | 4/1993 | Belcher | |
| 5,236,302 A * | 8/1993 | Weisgerber | F01D 5/06 415/199.5 |
| 6,279,322 B1 | 8/2001 | Moussa | |
| 6,325,595 B1 | 12/2001 | Breeze-Stringfellow et al. | |
| 6,361,277 B1 | 3/2002 | Bulman et al. | |
| 6,663,346 B2 | 12/2003 | Munsell et al. | |
| 7,442,006 B2 | 10/2008 | Nguyen et al. | |
| 7,717,667 B2 | 5/2010 | Urbassik et al. | |
| 8,172,506 B2 | 5/2012 | Pieczka et al. | |
| 8,678,760 B2 | 3/2014 | Clemen | |
| 9,567,914 B2 | 2/2017 | Twell | |
| 10,502,132 B2 | 12/2019 | Guijarro Valencia et al. | |
| 10,577,966 B2 | 3/2020 | Subramanian et al. | |
| 11,098,601 B2 | 8/2021 | King et al. | |
| 11,098,730 B2 | 8/2021 | Mazur | |
| 11,702,995 B2 | 7/2023 | Capron et al. | |

(Continued)

OTHER PUBLICATIONS

Farthing et al., The Use of Deswirl Nozzles to Reduce the Pressure Drop in a Rotating Cavity with a Radial Inflow, J. Turbomach, vol. 113, Issue 1, 1991, 106-114. (Abstract Only) https://doi.org/10.1115/1_2927727.

*Primary Examiner* — Katheryn A Malatek
(74) *Attorney, Agent, or Firm* — McCarter & English, LLP

(57) ABSTRACT

A compressor bleed-air boost system includes a high-pressure compressor comprising a first rotor disk and a second rotor disk coupled together via a drive arm and a rotor shaft. The rotor shaft is configured to rotate in a rotational direction about an axial centerline of the high-pressure compressor. The first rotor disk and the second rotor disk at least partially define a bleed-air cavity therebetween. The drive arm defines a bleed-air passage providing for fluid communication of a bleed-air between a primary flowpath of the high-pressure compressor and the bleed-air cavity. An impeller tube is at least partially positioned within the bleed-air cavity and includes a first end defining an inlet, and a second end defining an outlet in fluid communication with the bleed-air cavity. The outlet comprises a bleed-air flow guide.

15 Claims, 9 Drawing Sheets

(56) References Cited

U.S. PATENT DOCUMENTS

| | | |
|---|---|---|
| 11,725,530 B1 | 8/2023 | Subramanian et al. |
| 2003/0033815 A1 | 2/2003 | Proctor et al. |
| 2003/0133796 A1 | 7/2003 | Munsell et al. |
| 2004/0028529 A1 | 2/2004 | Austin et al. |
| 2016/0230702 A1 | 8/2016 | Charron et al. |
| 2017/0002678 A1 | 1/2017 | Subramanian et al. |
| 2018/0298759 A1* | 10/2018 | Cho .................. F04D 29/584 |
| 2020/0024857 A1 | 1/2020 | Yin et al. |
| 2020/0248571 A1 | 8/2020 | King et al. |
| 2020/0332669 A1 | 10/2020 | Tardif et al. |
| 2020/0386109 A1 | 12/2020 | Becker |
| 2022/0018310 A1 | 1/2022 | Humes |
| 2023/0151737 A1* | 5/2023 | Propheter-Hinckley ................ F01D 5/18 416/90 R |
| 2024/0026894 A1 | 1/2024 | Cao et al. |
| 2024/0133303 A1 | 4/2024 | Guijarro Valencia et al. |

\* cited by examiner

COMPRESSOR BLEED-AIR BOOST SYSTEM

FIELD

The present disclosure relates to a compressor of a gas turbine engine. More particularly, this disclosure is directed to a compressor bleed air boost system for a gas turbine engine.

BACKGROUND

Air flowing through a primary flowpath of a gas turbine engine is pressurized in a compressor and mixed with fuel in a combustor for generating hot combustion gases which flow downstream through turbine stages. A portion of the air commonly referred to as "bleed-air" may be bled from the compressor and used to cool or heat various sections or components of the gas turbine engine. The bleed-air may be routed from the primary flowpath via discrete holes defined in a drive arm that connects axially adjacent compressor rotor disks, into a bleed-air cavity defined between the axially adjacent compressor rotor disks and at least partially by the rotor shaft. As the bleed-air enters the bleed-air cavity, rotation of the rotor shaft and the rotor disks causes the bleed air to swirl in the direction of rotation of the rotor shaft, resulting in a pressure drop of the bleed-air within the bleed-air cavity, thus resulting in bleed-air cooling or heating efficiency losses.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
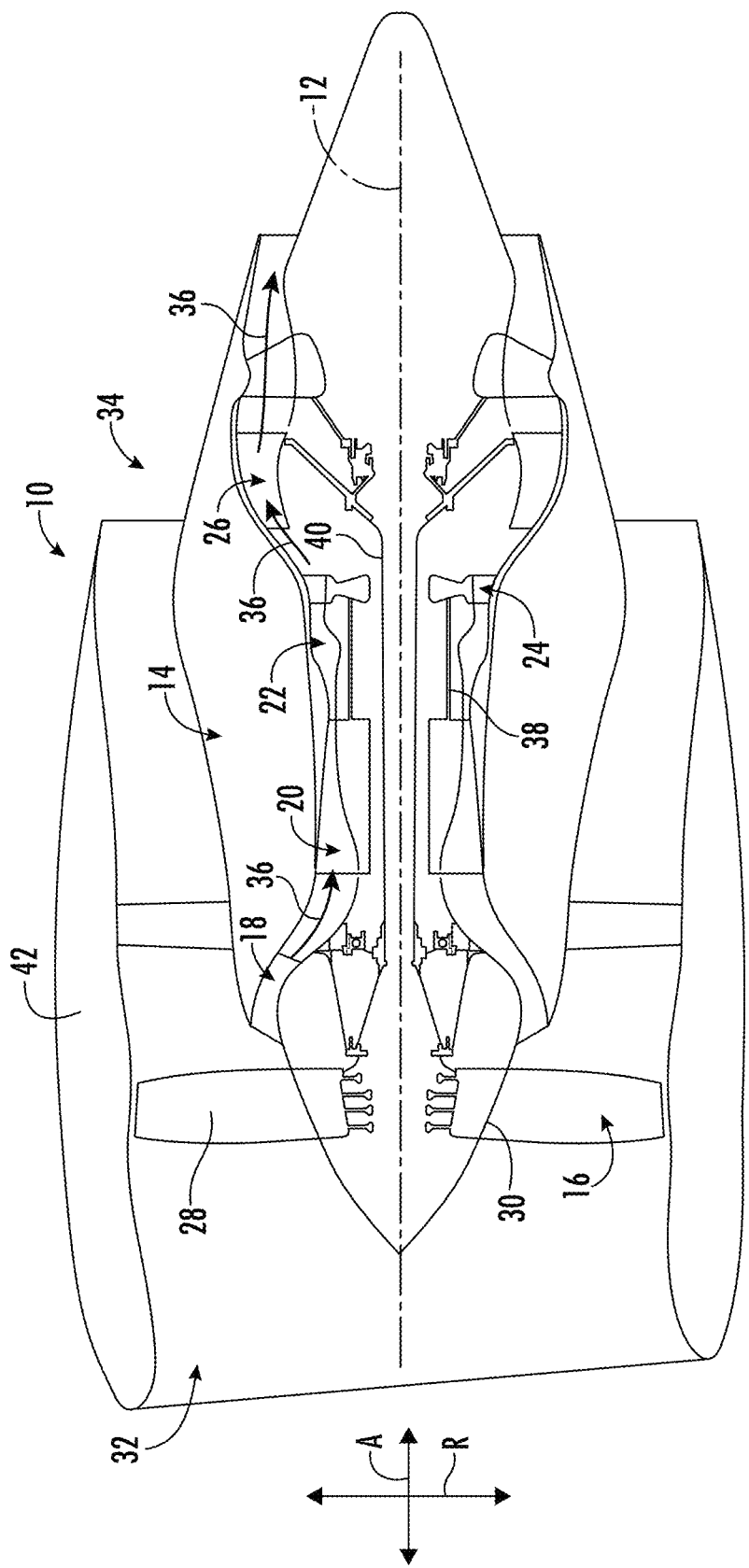
FIG. 1 is a cross-sectional schematic view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet and aft refers to a position closer to an engine nozzle or exhaust.

The following disclosure is directed to a compressor bleed-air boost system for a gas turbine engine. Compressor bleeds in rear stages are done through discrete holes on the drive arm which induce swirl to the bleed-air as it flows into a bleed-air cavity defined between adjacent rotor disks. As the air outboards those holes in the drive arm, because of conservation of angular momentum, pressure starts dropping within the bleed-air pressure cavities, thus reducing the pressure of the bleed-air being fed to the turbine section for cooling. The bleed-air boost system provided herein includes a bleed-air flow guide positioned at an outlet of an impeller tube positioned within the bleed-air cavity to allow more bleed-air and less drag in a circumferential (rotational) direction of the rotor shaft, thus reducing pressure drop and increasing pressure of the bleed-air provided to the turbine or to other components of the gas turbine engine.

Referring now to the drawings, FIG. 1 is a schematic illustration of an exemplary gas turbine engine 10 according to various embodiments of the present disclosure. As shown in FIG. 1, the gas turbine engine 10 generally defines an axial direction (A) extending parallel to a longitudinal centerline 12 of the gas turbine engine 10, and a radial direction (R) extending perpendicular to the longitudinal centerline 12 and to the axial direction A. The gas turbine engine 10 includes a turbomachine 14. The turbomachine 14 generally includes, in serial flow order, a fan assembly 16, a booster or low-pressure compressor 18, a high-pressure compressor 20, a combustor 22, a high-pressure turbine 24, and a low-pressure turbine 26. The fan assembly 16 includes an array of fan blades 28 extending radially outward from a fan rotor disk 30. The gas turbine engine 10 includes an inlet end 32 and an exhaust or outlet end 34. The low-pressure compressor 18, the high-pressure compressor 20, the combustor 22, the high-pressure turbine 24 and the low-pressure turbine 26 at least partially define a primary flowpath 36 through the gas turbine engine 10 and more particularly, through the turbomachine 14.

In operation, air flows through the fan assembly 16. A portion of the air is routed through the low-pressure compressor 18 and compressed therein. The compressed air is then supplied to the high-pressure compressor 20 for further compression. The relatively highly compressed air is delivered to the combustor 22 where it is mixed with fuel and burned to produce combustion gases. The combustion gases (not shown in FIG. 1) from the combustor 22 drives the high-pressure turbine 24 and the low-pressure turbine 26 such that the high-pressure turbine 24 drives the high-pressure compressor 20 by way of a high-pressure rotor shaft 38 and the low-pressure turbine 18 drives the low-pressure compressor 18 and the fan assembly 16 by way of a low-pressure shaft 40.

It should be appreciated that the gas turbine engine 10 depicted in FIG. 1 is provided by way of example only, and that in other exemplary embodiments, the gas turbine engine 10 may have other configurations. For example, although the gas turbine engine 10 depicted is configured as a ducted high-bypass gas turbine engine (e.g., including an outer nacelle 42), in other embodiments, the gas turbine engine 10 may be an unducted or non-ducted gas turbine engine (such that the fan assembly 16 is an unducted fan. It should also be appreciated that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
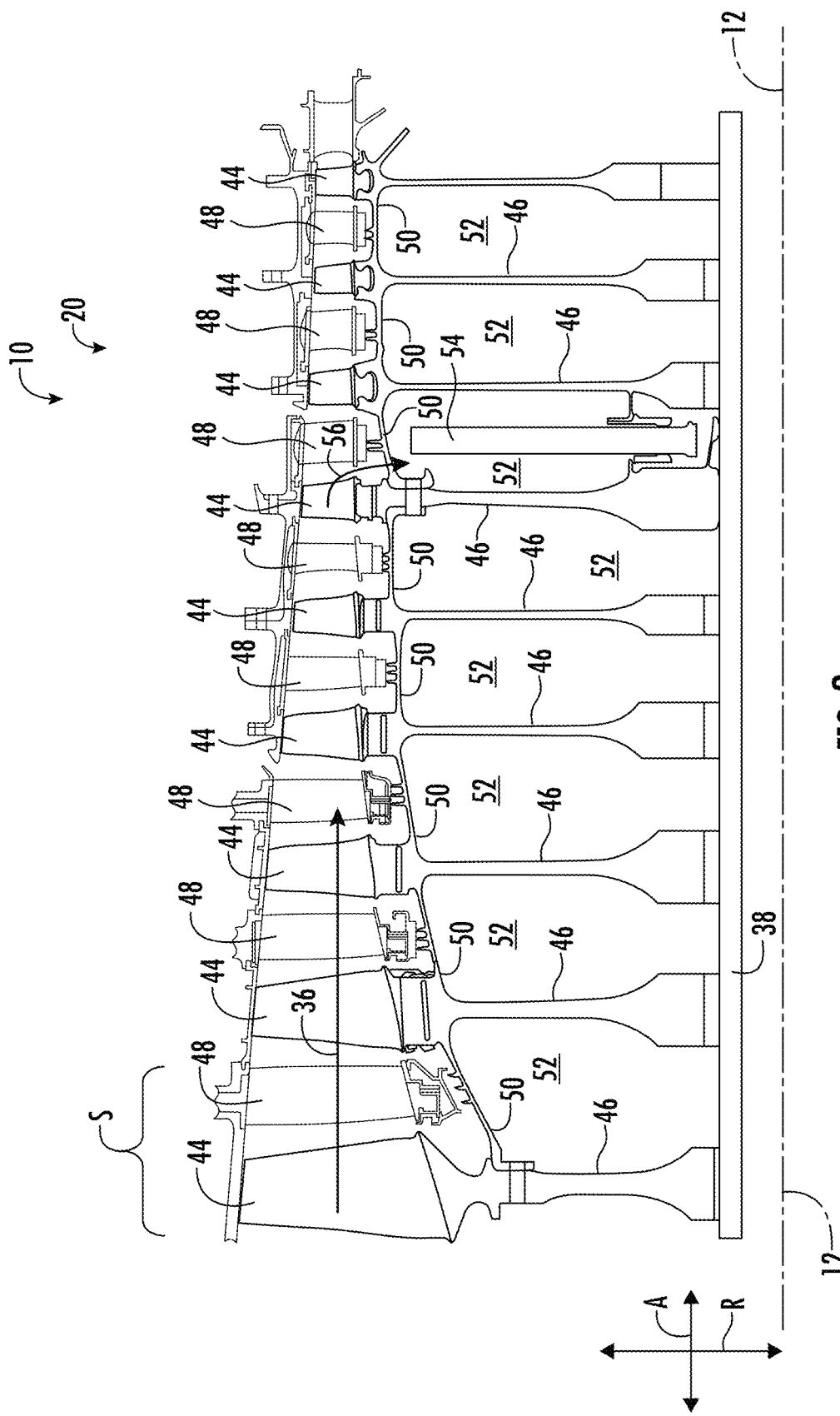
FIG. 2 is an enlarged side section view of a portion of the gas turbine engine shown in FIG. 1, including an exemplary high-pressure compressor as may be incorporated into the turbomachine shown in FIG. 1, according to exemplary embodiments of the present disclosure.

FIG. 2 provides an enlarged side section view of a portion of the gas turbine engine 10 shown in FIG. 1, including an exemplary high-pressure compressor 20 as may be incorporated into the turbomachine 14 shown in FIG. 1, according to exemplary embodiments of the present disclosure. As shown in FIG. 2, the high-pressure compressor 20 includes a plurality compressor stages(S). Although nine compressor stages S are shown in FIG. 2, it is to be appreciated that the high-pressure compressor 20 may include any number of compressor stages $S_{1+n}$ greater than two.

As shown in FIG. 2, each compressor stage S includes a row of rotor blades 44 attached to a rotor disk 46. Each rotor disk 46 is coupled to and rotates with the high-pressure rotor shaft 38 about the longitudinal centerline 12 during operation of the gas turbine engine 10. The rotor disks 46 and rotor blades 44 may be formed integrally, which are referred to as blisks, or may be connected via a dovetail connection as depicted. Each compressor stage S further includes a row of stator vanes 48. Each row of stator vanes 48 is disposed between two axially adjacent rows of rotor blades 44 with respect to axial direction A. The rotor disks 46 are connected or coupled together via drive arms 50 or other connecting means.

Bleed-air cavities 52 are defined between the rotor disks 46 of one or more stages S. The bleed-air cavities 52 may be further defined by drive arm 50 and the high-pressure rotor shaft 38. In exemplary embodiments, an impeller tube 54 is at least partially disposed within one of the bleed-air cavities 52. In operation, the bleed-air cavities 52 receive bleed-air 56 from a portion of the primary flowpath 36 defined by the high-pressure compressor 20. It is to be appreciated that although only one impeller tube 54 is shown in FIG. 2, the high-pressure compressor 20 may include any number of impeller tubes 54 as may be required or beneficial to the operation of the high-pressure compressor 20.

Figure 3:
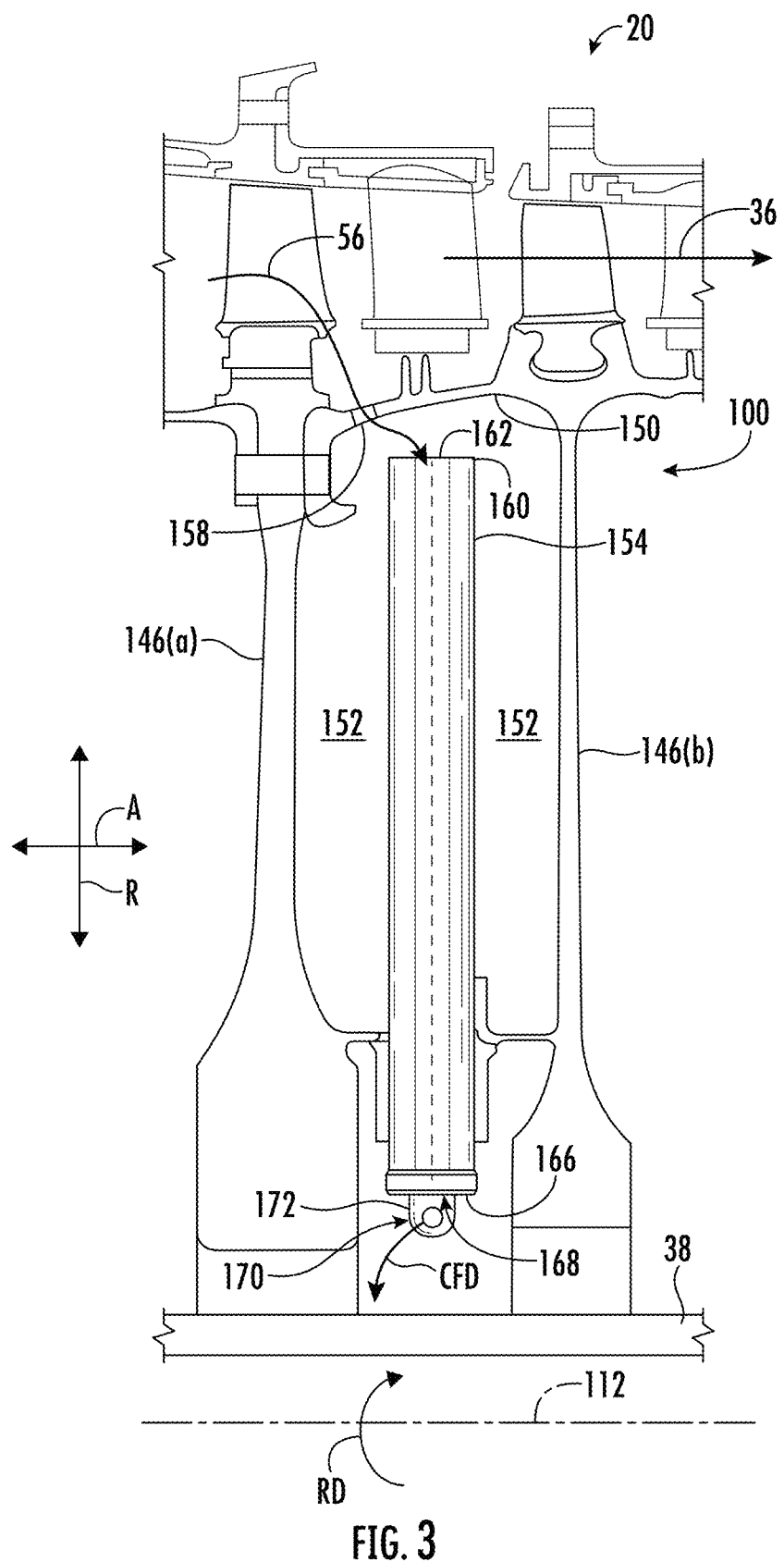
FIG. 3 is an enlarged detailed section view of a portion of the high-pressure compressor as shown in FIG. 2, according to exemplary embodiments of the present disclosure.

FIG. 3 provides an enlarged detailed section view of a portion of the high-pressure compressor 20 as shown in FIG. 2, according to exemplary embodiments of the present disclosure. As shown in FIG. 3, the high-pressure compressor 20 includes a compressor bleed-air boost system 100. The compressor bleed-air boost system 100 includes a first rotor disk 146(a), a second rotor disk 146(b), drive arm 150, and impeller tube 154. The second rotor disk 146(b) is spaced axially adjacent to the first rotor disk 146(a) with respect to axial direction A and an axial centerline 112 of the high-pressure compressor 20. The axial centerline 112 of the high-pressure compressor 20 may be coaxially aligned with the longitudinal centerline 12 of the gas turbine engine 10 (FIG. 1).

In the embodiment shown in FIG. 3, the first rotor disk 146(a) and the second rotor disk 146(b) are coupled together via drive arm 150. The first rotor disk 146(a) and the second rotor disk 146(b) are also coupled to the high-pressure rotor shaft 38. The first rotor disk 146(a), the second rotor disk 146(b), and the high-pressure rotor shaft 38 are configured to rotate in a rotational direction (RD) about the axial centerline 112 of the high-pressure compressor 20. The rotational direction RD may be clockwise or counterclockwise about the axial centerline 112 of the high-pressure compressor 20.

The first rotor disk 146(a) and the second rotor disk 146(b) at least partially define a bleed-air cavity 152 therebetween. The drive arm 150 defines a bleed-air passage 158 providing for fluid communication of bleed-air 56 from the portion of the primary flowpath 36 defined within the high-pressure compressor 20 to the bleed-air cavity 152. Bleed-air 56 is subsequently utilized as cooling or heating air for cooling or heating other components of turbomachine 14 or may be routed to other locations of the gas turbine engine 10 (FIG. 1).

As shown in FIG. 3, impeller tube 154 is disposed within the bleed-air cavity 152 and positioned axially between the first rotor disk 146(a) and the second rotor disk 146(b). The impeller tube 154 includes a first end 160 defining an inlet 162, an impeller tube flow passage 164 (shown in FIG. 6), and a second end 166 defining an outlet 168. The inlet 162, the impeller tube flow passage 164, and the outlet 168 are in fluid communication with the bleed-air cavity 152. As shown in FIG. 3, the impeller tube 154 further includes a bleed-air flow guide 170. The bleed-air flow guide 170 is oriented or formed to guide the bleed-air 56 flowing from the outlet 168 in a counter flow direction (CFD) that is counter to the rotational direction RD of the high-pressure rotor shaft 38, thus reducing or preventing pressure drop of the bleed-air 56 as it exits the outlet 168 proximate to the high-pressure rotor shaft 38 within the bleed-air cavity 152. As used herein, the term "counter flow direction" is intended to include a flow direction that is opposite or at least perpendicular or orthogonal to (e.g., not in the same or similar direction of) the rotational direction RD of the high-pressure rotor shaft 38 whether the rotational direction RD is clockwise or counterclockwise.

Figure 4:
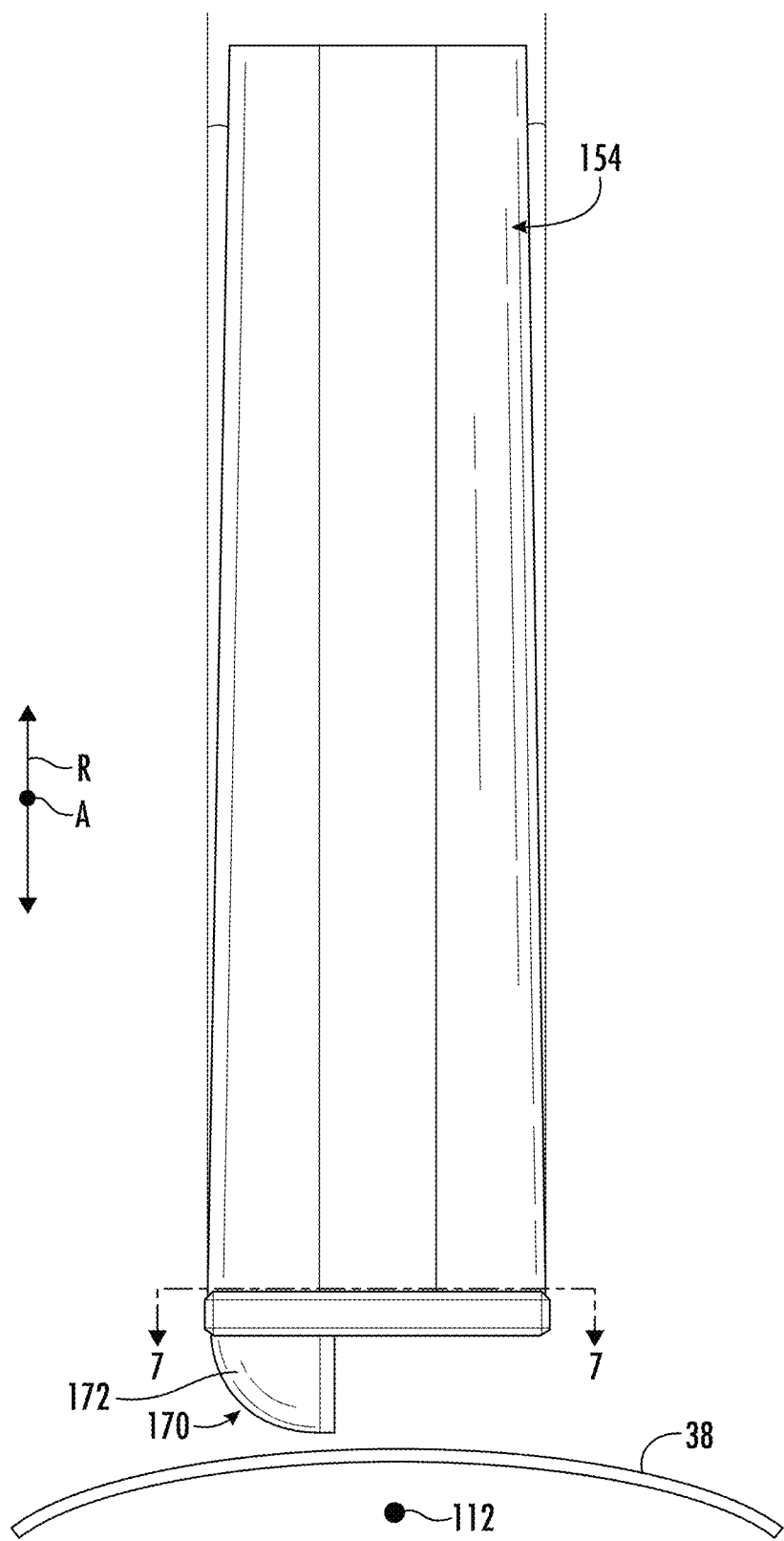
FIG. 4 is a side view of an impeller tube as shown in FIG. 3, according to one embodiment of the present disclosure.
Figure 5:
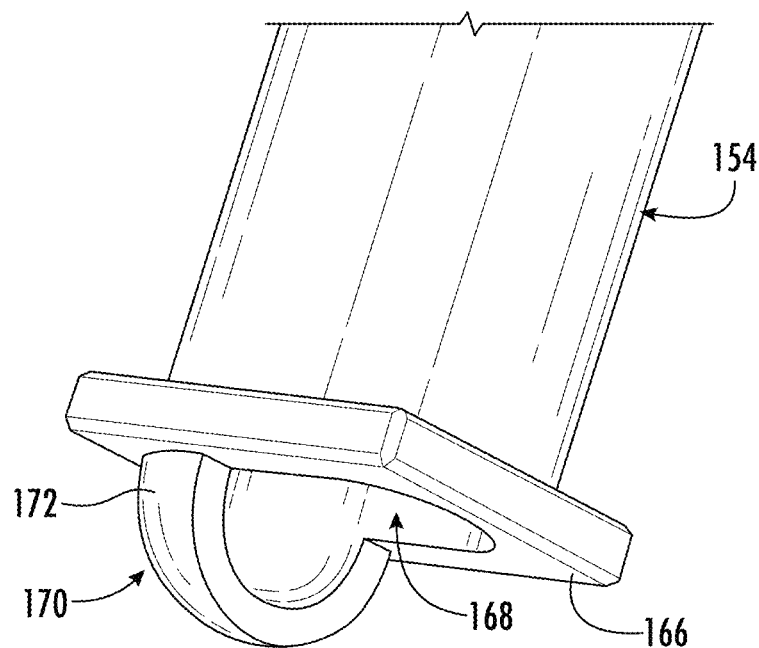
FIG. 5 is a perspective view of a portion of the impeller tube as shown in FIG. 4, including a second end, an outlet, and a bleed air flow guide, according to embodiments of the present disclosure.

FIG. 4 provides a side view of the impeller tube 154 as shown in FIG. 3. FIG. 5 provides a perspective view of a portion of the impeller tube 154 as shown in FIG. 4, including the second end 166, the outlet 168, and the bleed-air flow guide 170, according to embodiments of the present disclosure. In exemplary embodiment shown in FIG. 4, the impeller tube 154 may be tapered inward along the radial direction R from the second end 166 to the first end 160. In the exemplary embodiment shown in FIG. 3, FIG. 4, and FIG. 5 collectively, the bleed-air flow guide 170 is formed as a scoop 172. The scoop 172 may have a generally hemispherical shape. As shown in FIG. 3 and FIG. 4, the scoop 172 extends from the second end 166 radially inward with respect to radial direction R, towards the axial centerline 112 of the high-pressure compressor 120 and the high-pressure rotor shaft 38 (FIG. 3). The scoop 172 also extends across the second end 166 in the axial direction A.

Figure 6:
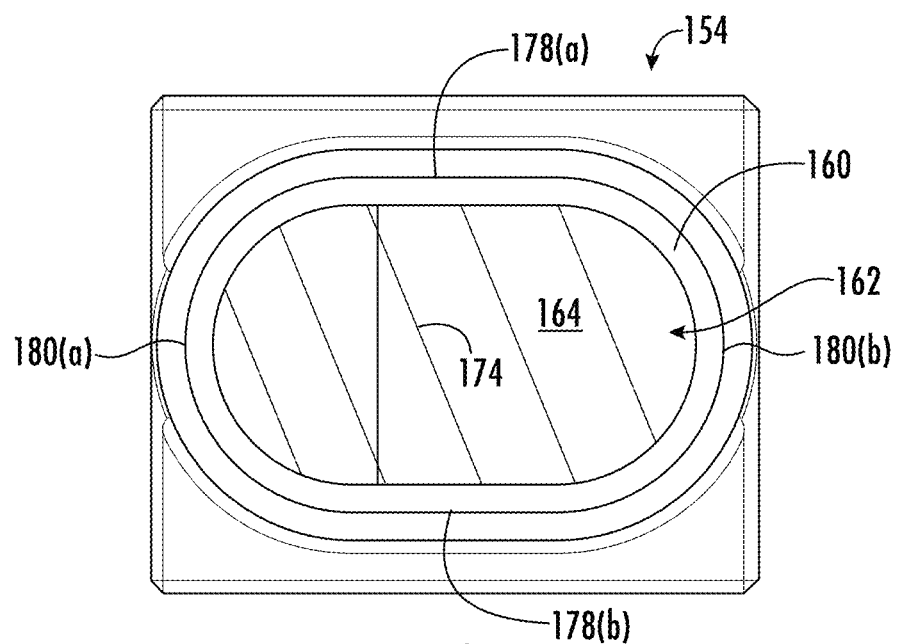
FIG. 6 is a top view of a first end, particularly an inlet of the impeller tube shown in FIG. 4.
Figure 7:
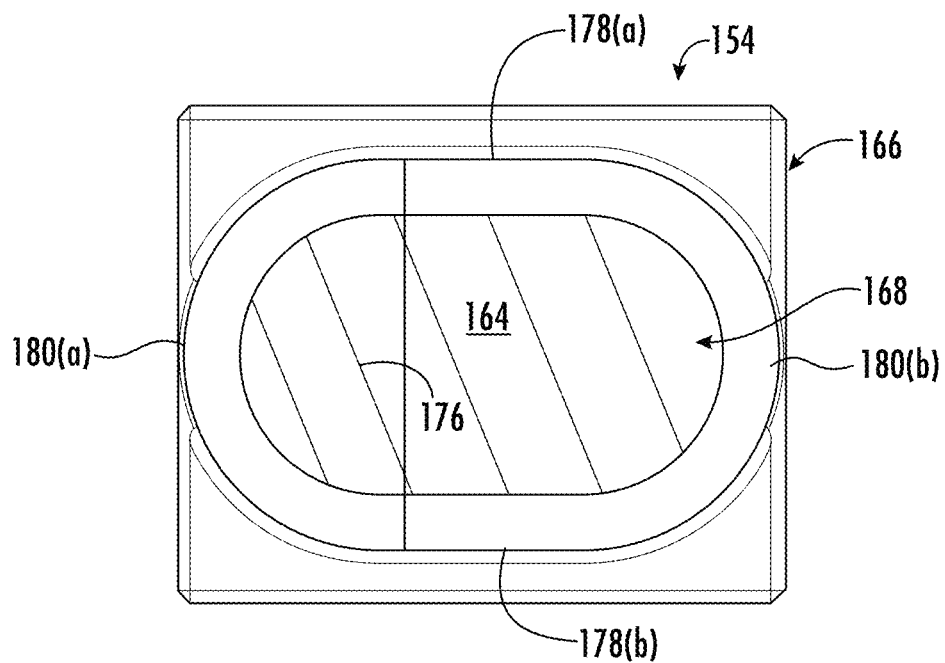
FIG. 7 is a cross-section top view of the impeller tube taken along section line 7-7 as shown in FIG. 4, according to an embodiment of the present disclosure.
Figure 8:
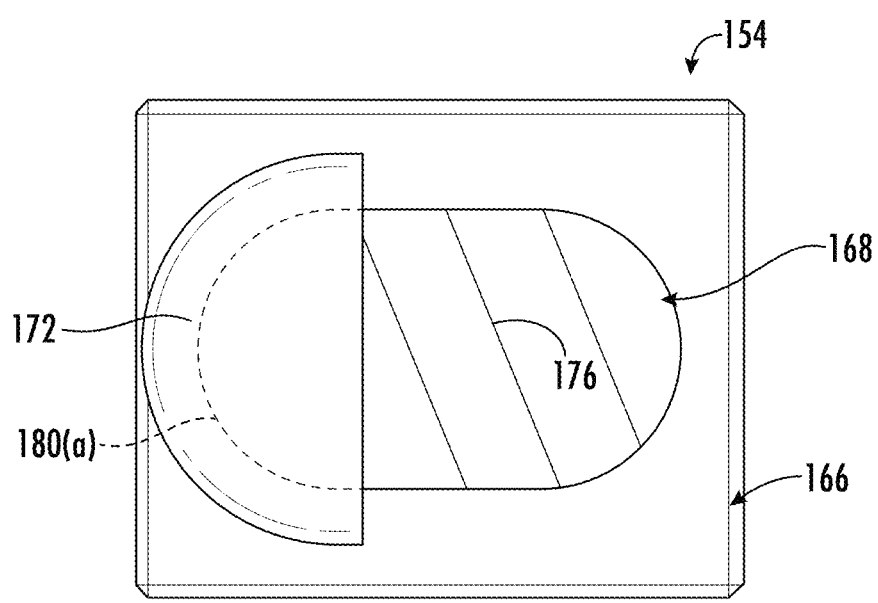
FIG. 8 is a bottom view of the impeller tube shown in FIG. 4, according to an exemplary embodiment of the present disclosure.

FIG. 6 provides a top view of the first end 160, particularly the inlet 162 of the impeller tube 154 shown in FIG. 4. FIG. 7 provides a cross-section top view of the impeller tube 154 taken along section line 7-7 as shown in FIG. 4, proximate to the second end 166 and detailing the outlet 168. FIG. 8 provides a bottom view of the impeller tube 154 according to an exemplary embodiment of the present disclosure.

Referring to FIG. 6, the inlet 162 defines an inlet flow area 174, and as shown in FIG. 7, the outlet 168 defines an outlet flow area 176. In this embodiment, as shown in FIG. 6 and FIG. 7 collectively, the inlet flow area 174 may be smaller or less than the outlet flow area 176.

In exemplary embodiments, as shown in FIG. 6 and FIG. 7 collectively, the impeller tube 154, particularly the impeller tube flow passage 164 defined by the impeller tube 154, may have a noncircular cross-section at the first end 160 or inlet 162. In addition, or in the alternative, the impeller tube 154 may have a noncircular cross-section at the second end 166 or outlet 168. The term non-circular may include, but is not limited to, oval, teardrop, ellipse, flat-sided oval or racetrack cross sectional shapes. For example, as shown in FIG. 6 and FIG. 7 collectively, the impeller tube 154 may be formed as a flat-sided oval or "oval racetrack" shaped tube including a pair of opposing flat sides 178(a), 178(b), and a pair of opposing arcuate sides 180(a), 180(b).

In exemplary embodiments, as shown in FIG. 8, the scoop 172 extends at least partially around the outlet 168 at the second end 166. For example, in the embodiment illustrated, the scoop 172 extends at least partially along arcuate side 180(a) (shown in hidden lines). In particular embodiments, the scoop 172 may extend between about 10 percent and about 90 percent of the outlet flow area 176.

Figure 9:
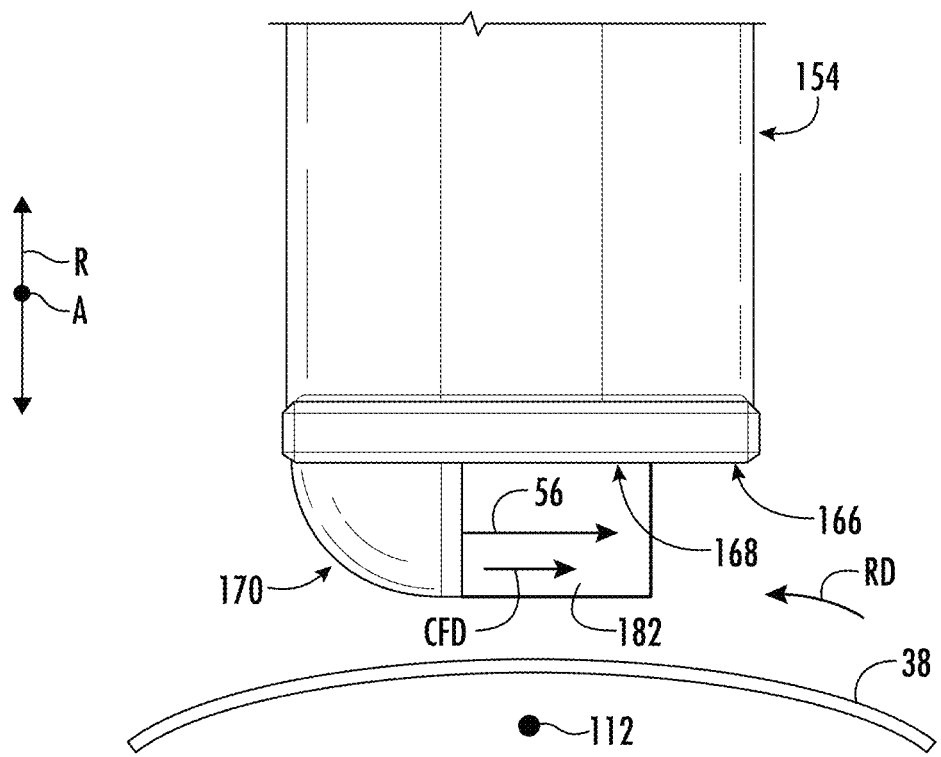
FIG. 9 is a side view of a portion of the impeller tube as shown in FIG. 4, including the second end, the outlet, and the bleed air flow guide, according to embodiments of the present disclosure.
Figure 10:
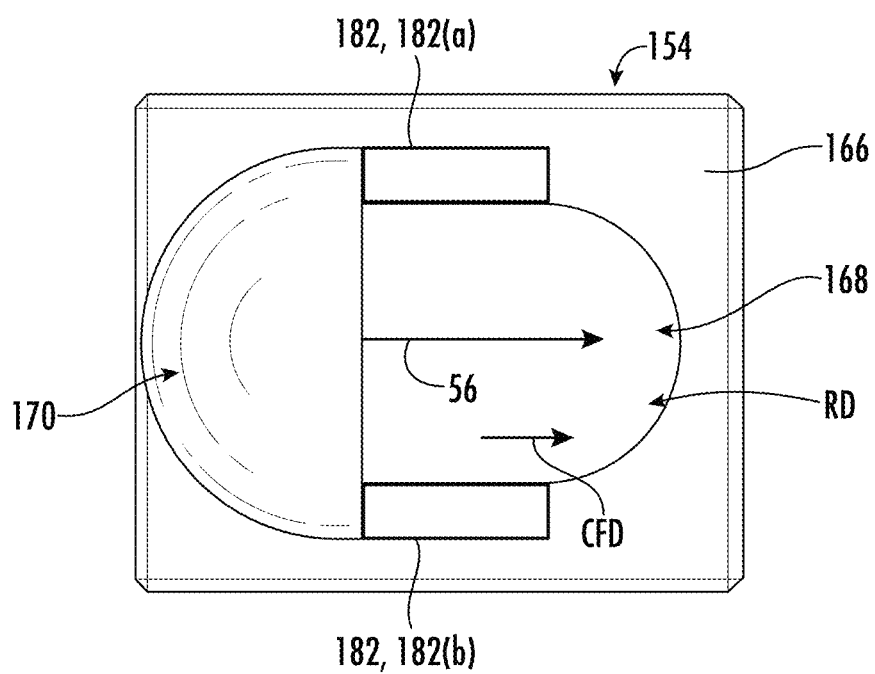
FIG. 10 is a bottom view of the impeller tube as shown in FIG. 3, according to an exemplary embodiment of the present disclosure.

FIG. 9 provides a side view of a portion of the impeller tube 154 as shown in FIG. 4, including the second end 166, the outlet 168, and the bleed-air flow guide 170, according to embodiments of the present disclosure. FIG. 10 provides a bottom view of the impeller tube 154 including the second end 166, the outlet 168, and the bleed-air flow guide 170 according to an exemplary embodiment of the present disclosure. In exemplary embodiments, as shown in FIG. 9 and FIG. 10 collectively, the bleed-air flow guide 170 may include at least one wall 182 that extends radially inward with respect to radial direction R from the second end 166 towards the axial center line 112 of the high-pressure compressor 20 and in the axial direction A.

The wall 182 may extend axially from the scoop 172 along either of the opposing flat sides 178(a), 178(b). In particular embodiments, as shown in FIG. 10, the bleed-air flow guide 170 may include a first wall 182(a) extending along flat side 178(a). In addition, or in the alternative, the bleed-air flow guide 170 may include a second wall 182(b) extending along flat side wall 178(b). In operation, the wall 182 or walls 182(a), 182(b) help(s) to guide the bleed-air 56 exiting from the impeller tube flow passage 164 (FIG. 7) via the outlet 168 in the axial direction A shown in FIG. 9 which is equivalent to the counter rotational direction CRD shown in FIG. 3.

Figure 11:
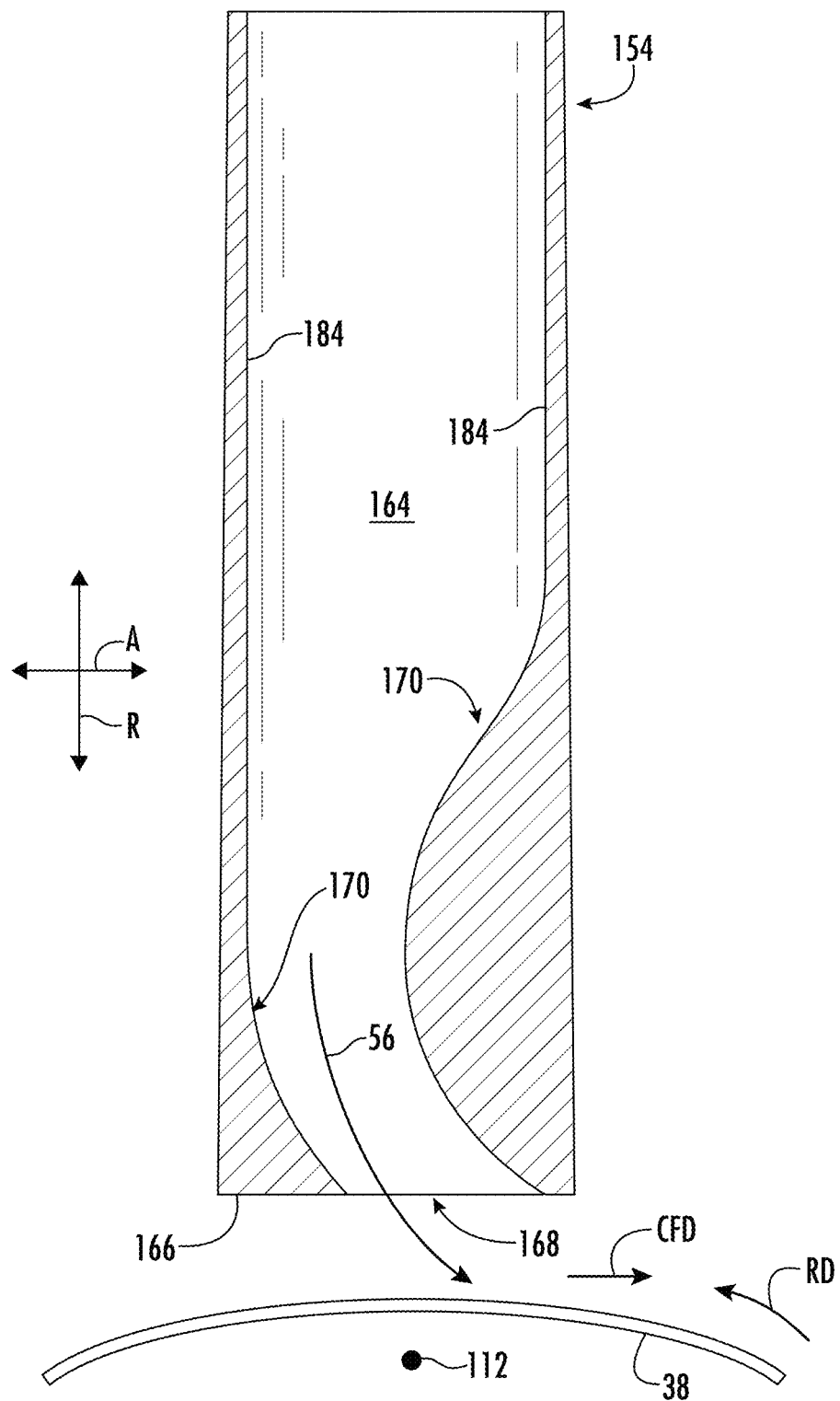
FIG. 11 is a cross-section side view of the impeller tube as shown in FIG. 3, according to another embodiment of the present disclosure.

FIG. 11 provides a cross-section side view of the impeller tube 154 according to another embodiment of the present disclosure. As shown in FIG. 11, the bleed-air flow guide 170 may be formed along an inner surface 184 of the impeller tube 154 proximate to the second end 166 and the outlet 168. As previously provided, the bleed-air flow guide 170 is formed or oriented to guide the bleed-air 56 flowing through the impeller tube flow passage 164 and out of the outlet 168 in counter flow direction (CFD) that is counter to the rotational direction RD of the high-pressure rotor shaft 38, thus reducing or preventing pressure drop of the bleed-air 56 as it exits the outlet 168 proximate to high-pressure rotor shaft 38 (FIG. 3) within the bleed-air cavity 152 (FIG. 3).

Figure 12:
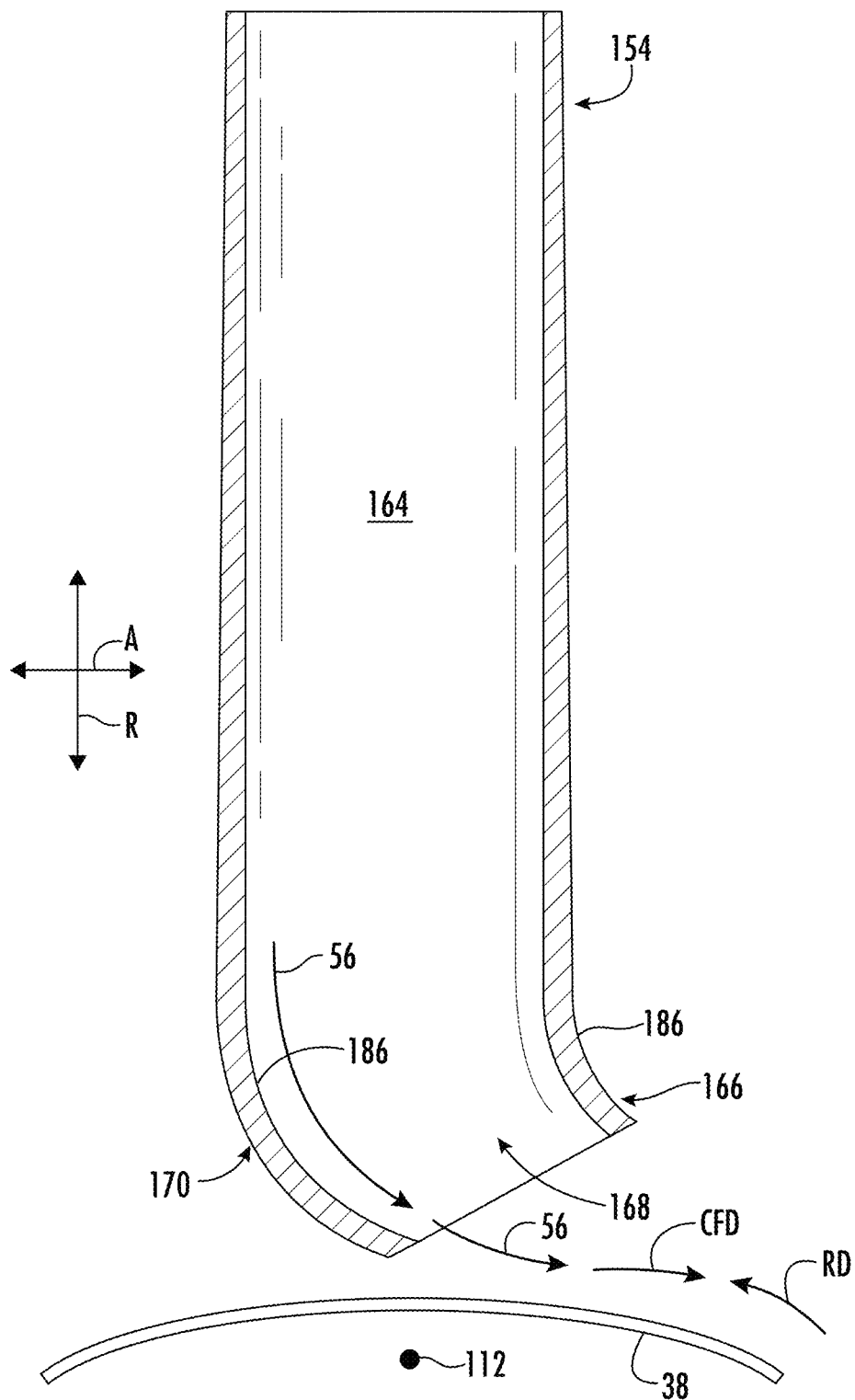
FIG. 12 provides a cross-section side view of the impeller tube as shown in FIG. 3, according to another embodiment of the present disclosure.

FIG. 12 provides a cross-section side view of the impeller tube 154 according to another embodiment of the present disclosure. As shown in FIG. 12, the bleed-air flow guide 170 may be formed as a bent portion 186 of the impeller tube 154 proximate to the second end 166 and the outlet 168. As previously provided, the bleed-air flow guide 170 is formed or oriented to guide the bleed-air 56 flowing through the impeller tube flow passage 164 and out of the outlet 168 in counter flow direction (CFD) that is counter to the rotational direction RD of the high-pressure rotor shaft 38, thus reducing or preventing pressure drop of the bleed-air 56 as it exits the outlet 168 proximate to high-pressure rotor shaft 38 (FIG. 3) within the bleed-air cavity 152 (FIG. 3).

In operation, the bleed-air flow guide 170 of the impeller tube 154 will work to force the bleed-air exiting the impeller tube 154 to go in an opposite or counter direction to that of the rotational direction RD of the high-pressure rotor shaft 38. This way, the highly swirled air will be braked and the inherent pressure losses of highly spinning air due to the conservation of angular momentum will be mitigated. In other words, the bleed-air flow guide 170 or scoop 172 acts as a de-swirler and works best in combination with an impeller tube with an enlarged outlet flow area 176. Enlarging the outlet flow area 176 prevents or avoids tangential acceleration of the flow of the bleed-air at the exit. Additionally, the wall 182 or walls 182(a), 182(b), may prevent bleed-air flow recirculation by helping to guide the flow of bleed-air aft towards the second rotor disk 146(b), thus improving aerodynamics and reducing pressure losses within the bleed-air cavity 152.

Further aspects are provided by the subject matter of the following clauses:

A compressor bleed-air boost system, comprising: a high-pressure compressor comprising a first rotor disk and a second rotor disk, wherein the first rotor disk and the second rotor disk are coupled together via a drive arm and a rotor shaft, wherein the rotor shaft is configured to rotate in a rotational direction about an axial centerline of the high-pressure compressor, wherein the first rotor disk and the second rotor disk at least partially define a bleed-air cavity therebetween, and wherein the drive arm defines a bleed-air passage providing for fluid communication of a bleed-air between a primary flowpath of the high-pressure compressor and the bleed-air cavity; and an impeller tube at least partially disposed within the bleed-air cavity, wherein the impeller tube includes a first end defining an inlet, and a second end defining an outlet, wherein the inlet and the outlet are in fluid communication with the bleed-air cavity, wherein the outlet comprises a bleed-air flow guide.

The compressor bleed-air boost system of the preceding or any following clause, wherein the bleed-air flow guide is oriented to guide the bleed-air in a counter flow direction that is counter to the rotational direction.

The compressor bleed-air boost system of any preceding or any following clause, wherein the bleed-air flow guide is formed as a scoop extending from the second end radially inwardly towards the axial centerline of the high-pressure compressor.

The compressor bleed-air boost system of any preceding or following clause, wherein the impeller tube has a non-circular cross-section.

The compressor bleed-air boost system of any preceding or any following clause, wherein the impeller tube has a teardrop cross-section at the second end.

The compressor bleed-air boost system of any preceding or any following clause, wherein the impeller tube has a flat-sided oval cross-section at the second end.

The compressor bleed-air boost system of any preceding or any following clause, wherein the bleed-air flow guide is formed as a scoop extending from the second end radially inwardly towards the axial centerline of the compressor.

The compressor bleed-air boost system of any preceding or any following clause, wherein the bleed-air flow guide includes a wall extending from the second end radially inwardly towards the axial centerline of the high-pressure compressor.

The compressor bleed-air boost system of any preceding or any following clause, wherein the impeller tube defines an inner surface, wherein the bleed-air flow guide is formed along the inner surface proximate to the second end.

The compressor bleed-air boost system of any preceding or any following clause, wherein the impeller tube is tapered between the second end and the first end.

The compressor bleed-air boost system of any preceding or any following clause, wherein the impeller tube includes a bent portion defined proximate to the second end, wherein the bleed-air flow guide is defined by the bent portion of the impeller tube.

A gas turbine engine, comprising: a high-pressure compressor, a combustion section, and a turbine section arranged in serial flow along a rotor shaft, the high-pressure compressor, combustion section, and turbine section defining a primary flowpath through the gas turbine engine, the high-pressure compressor comprising: a first rotor disk; a second rotor disk, wherein the first rotor disk and the second rotor disk are coupled together via a drive arm and the rotor shaft, wherein the rotor shaft is configured to rotate in a rotational direction about an axial centerline of the high-pressure compressor, wherein the first rotor disk and the second rotor disk at least partially define a bleed-air cavity therebetween, and wherein the drive arm defines a bleed-air passage providing for fluid communication of a bleed-air between a primary flowpath of the high-pressure compressor and the bleed-air cavity; and an impeller tube at least partially disposed within the bleed-air cavity, wherein the impeller tube includes a first end defining an inlet, and a second end defining an outlet, wherein the inlet and the outlet are in fluid communication with the bleed-air cavity, wherein the outlet comprises a bleed-air flow guide.

The gas turbine engine of the preceding or any following clause, wherein the bleed-air flow guide is oriented to guide the bleed-air in a counter flow direction that is counter to the rotational direction.

The gas turbine engine of any preceding or following clause, wherein the bleed-air flow guide is formed as a scoop extending from the second end radially inwardly towards the axial centerline of the high-pressure compressor.

The gas turbine engine of any preceding or following clause, wherein the impeller tube has a noncircular cross-section.

The gas turbine engine of any preceding or following clause, wherein the impeller tube has a teardrop cross-section.

The gas turbine engine of any preceding or following clause, wherein the impeller tube has a flat-sided oval cross-section.

The gas turbine engine of any preceding or following clause, wherein the bleed-air flow guide is formed as a scoop extending from the second end radially inwardly towards the axial centerline of the high-pressure compressor.

The gas turbine engine of any preceding or following clause, bleed-air flow guide further comprises a wall extending from the second end radially inwardly towards the axial centerline of the high-pressure compressor.

The gas turbine engine of any preceding or following clause, wherein the bleed-air flow guide is formed along an inner surface of the impeller tube proximate to the second end.

We claim:

1. A compressor bleed-air boost system, comprising:
   a high-pressure compressor comprising a first rotor disk and a second rotor disk, wherein the first rotor disk and the second rotor disk are coupled together via a drive arm and a rotor shaft, wherein the rotor shaft is configured to rotate in a rotational direction about an axial centerline of the high-pressure compressor, wherein the first rotor disk and the second rotor disk at least partially define a bleed-air cavity therebetween, and wherein the drive arm defines a bleed-air passage providing fluid communication of a bleed-air between a primary flowpath of the high-pressure compressor and the bleed-air cavity; and
   an impeller tube at least partially disposed within the bleed-air cavity, wherein the impeller tube includes a first end defining an inlet and a second end defining an outlet, wherein the inlet and the outlet are in fluid communication with the bleed-air cavity, wherein the outlet comprises a bleed-air flow guide;
   wherein the impeller tube is tapered inward from the second end to the first end.

2. The compressor bleed-air boost system of claim 1, wherein the bleed-air flow guide is oriented to guide the bleed-air in a counter flow direction that is counter to the rotational direction.

3. The compressor bleed-air boost system of claim 1, wherein the bleed-air flow guide is formed as a scoop extending from the second end radially inwardly towards the axial centerline of the high-pressure compressor.

4. The compressor bleed-air boost system of claim 1, wherein the impeller tube has a noncircular cross-section.

5. The compressor bleed-air boost system of claim 1, wherein the impeller tube has a flat-sided oval cross-section at the second end.

6. The compressor bleed-air boost system of claim 1, wherein the bleed-air flow guide includes a wall extending from the second end radially inwardly towards the axial centerline of the high-pressure compressor.

7. The compressor bleed-air boost system of claim 1, wherein the impeller tube defines an inner surface, and wherein the bleed-air flow guide is formed along the inner surface proximate to the second end.

8. The compressor bleed-air boost system of claim 1, wherein the impeller tube includes a bent portion defined proximate to the second end, and wherein the bleed-air flow guide is defined by the bent portion of the impeller tube.

9. A gas turbine engine, comprising:
a high-pressure compressor, a combustion section, and a turbine section arranged in serial flow along a rotor shaft, the high-pressure compressor, the combustion section, and the turbine section defining a primary flowpath through the gas turbine engine, the high-pressure compressor comprising:
a first rotor disk;
a second rotor disk, wherein the first rotor disk and the second rotor disk are coupled together via a drive arm and the rotor shaft, wherein the rotor shaft is configured to rotate in a rotational direction about an axial centerline of the high-pressure compressor, wherein the first rotor disk and the second rotor disk at least partially define a bleed-air cavity therebetween, and wherein the drive arm defines a bleed-air passage providing fluid communication of a bleed-air between the primary flowpath of the high-pressure compressor and the bleed-air cavity; and
an impeller tube at least partially disposed within the bleed-air cavity, wherein the impeller tube includes a first end defining an inlet, and a second end defining an outlet, wherein the inlet and the outlet are in fluid communication with the bleed-air cavity, wherein the outlet comprises a bleed-air flow guide;
wherein the impeller tube is tapered inward from the second end to the first end.

10. The gas turbine engine of claim 9, wherein the bleed-air flow guide is oriented to guide the bleed-air in a counter flow direction that is counter to the rotational direction.

11. The gas turbine engine of claim 9, wherein the bleed-air flow guide is formed as a scoop extending from the second end radially inwardly towards the axial centerline of the high-pressure compressor.

12. The gas turbine engine of claim 9, wherein the impeller tube has a noncircular cross-section.

13. The gas turbine engine of claim 9, wherein the impeller tube has a flat-sided oval cross-section.

14. The gas turbine engine of claim 9, wherein the bleed-air flow guide further comprises a wall extending from the second end radially inwardly towards the axial centerline of the high-pressure compressor.

15. The gas turbine engine of claim 9, wherein the impeller tube defines an inner surface, and wherein the bleed-air flow guide is formed along the inner surface proximate to the second end.

* * * * *